(12) United States Patent
Wang et al.

(10) Patent No.: US 9,297,319 B2
(45) Date of Patent: Mar. 29, 2016

(54) CONTROL OF EGR, FRESH MASS AIR FLOW, AND BOOST PRESSURE FOR INTERNAL COMBUSTION ENGINES

(75) Inventors: Yue-Yun Wang, Troy, MI (US); Ibrahim Haskara, Macomb, MI (US); Francesco Castorina, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1223 days.

(21) Appl. No.: 12/982,994

(22) Filed: Dec. 31, 2010

(65) Prior Publication Data
US 2012/0173118 A1 Jul. 5, 2012

(51) Int. Cl.
F02D 41/14 (2006.01)
F02D 41/00 (2006.01)
F02D 35/02 (2006.01)
F02D 41/18 (2006.01)

(52) U.S. Cl.
CPC ........ F02D 41/0047 (2013.01); F02D 41/0002 (2013.01); F02D 35/023 (2013.01); F02D 41/0007 (2013.01); F02D 41/0072 (2013.01); F02D 41/18 (2013.01); F02D 2041/0017 (2013.01); F02D 2041/141 (2013.01); F02D 2041/1434 (2013.01); F02D 2200/0402 (2013.01); Y02T 10/42 (2013.01); Y02T 10/47 (2013.01)

(58) Field of Classification Search
CPC ............ F02D 41/0002; F02D 41/0007; F02D 41/0055; F02D 41/0047–41/0077; F02D 2041/0017; F02D 2041/141; F02D 2041/1434; F02D 2200/0402

USPC .......................................... 701/102, 103, 108
See application file for complete search history.

(56) References Cited

U.S. PATENT DOCUMENTS

| 5,666,918 | A  | * | 9/1997  | Pallett et al. ................... 123/350  |
| 6,016,460 | A  | * | 1/2000  | Olin et al. ...................... 701/102  |
| 6,112,724 | A  | * | 9/2000  | Kotwicki et al. ............. 123/494 |
| 6,293,267 | B1 | * | 9/2001  | Smith et al. ............... 123/568.22 |
| 6,321,157 | B1 | * | 11/2001 | Sun et al. ........................ 701/103 |
| 7,438,061 | B2 | * | 10/2008 | Wang et al. ................. 123/559.1 |
| 7,725,199 | B2 | * | 5/2010  | Brackney ........................ 700/29 |
| 2010/0170244 | A1 | | 7/2010  | Brooks et al. |

OTHER PUBLICATIONS

U.S. Appl. No. 12/693,613, Not Publ'd, Kang et al.
U.S. Appl. No. 12/409,761, Not Publ'd, Wang et al.
(Continued)

*Primary Examiner* — Lindsay Low
*Assistant Examiner* — Robert Werner

(57) ABSTRACT

An engine includes an exhaust gas recirculation circuit, an air throttle system, and a charging system. A method to control the engine includes determining a feed forward control command for a first selected one of the exhaust gas recirculation system, the air throttle system, and the charging system based on an inverse flow model of the first selected system. This includes monitoring a first input based upon an effective flow area of the first selected system, monitoring a second input based upon a pressure value within the first selected system, and determining the feed forward control command for the first selected system based upon the first input and the second input. The first selected system is controlled based upon the feed forward control command for the first selected system.

23 Claims, 6 Drawing Sheets

(56) References Cited

OTHER PUBLICATIONS

U.S. Appl. No. 12/848,188, Not Publ'd, Wang et al.

Wei et al., Gain Scheduled H-Infinity Control for Air Path Systems of Diesel Engines Using LPV Techniques, IEEE Transactions on Control Systems Technology, vol. 15, No. 3, pp. 406-415, May 2007.

* cited by examiner

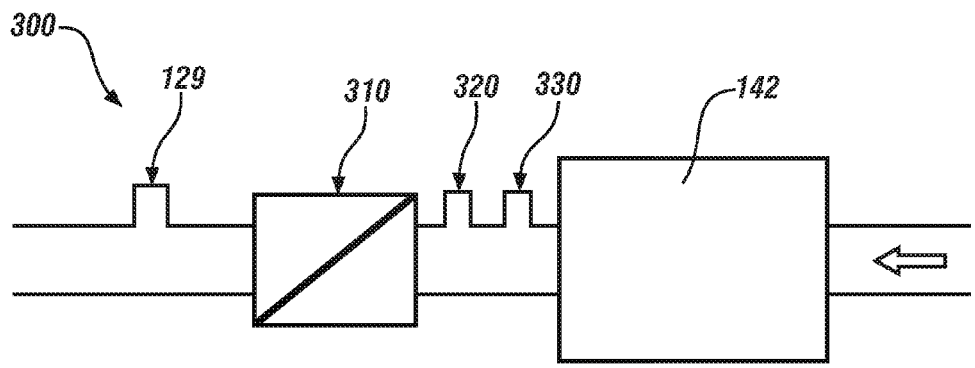
FIG. 8
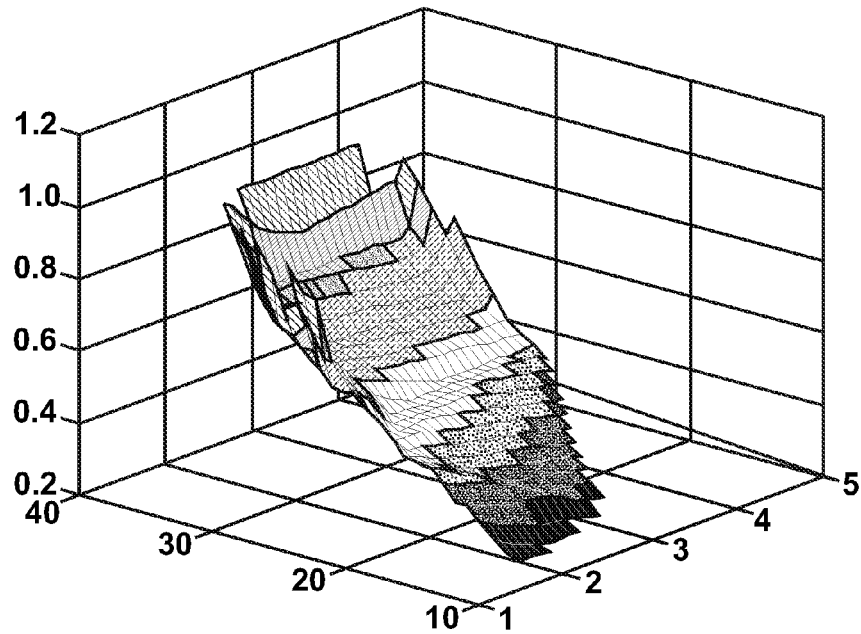
FIG. 9
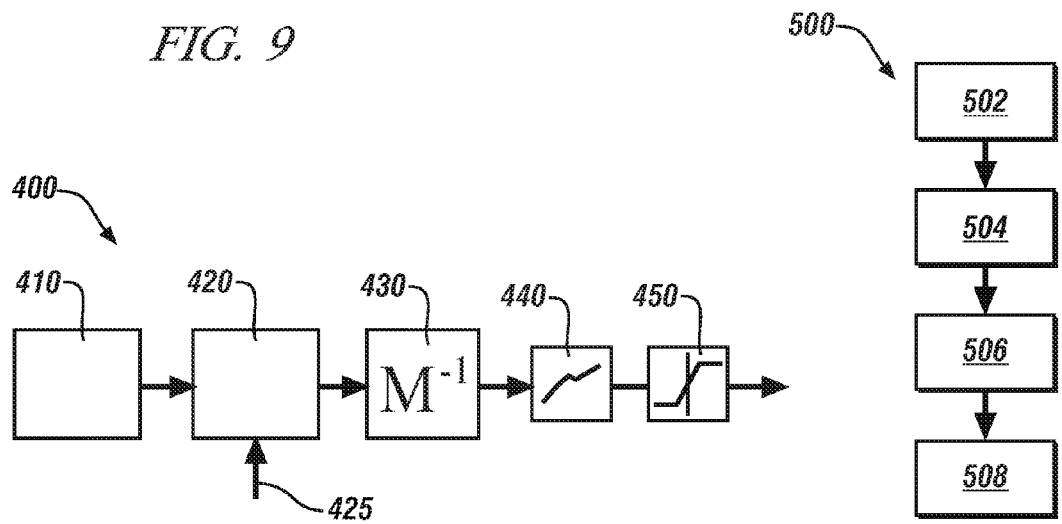
FIG. 10
FIG. 11

CONTROL OF EGR, FRESH MASS AIR FLOW, AND BOOST PRESSURE FOR INTERNAL COMBUSTION ENGINES

TECHNICAL FIELD

This disclosure is related to control of internal combustion engines.

BACKGROUND

The statements in this section merely provide background information related to the present disclosure and may not constitute prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example, as provided by an accessory belt, to drive a compressor providing boost air to the engine.

Exhaust gas recirculation (EGR) is another parameter that can be controlled. An exhaust gas flow within the exhaust system of an engine is depleted of oxygen and is essentially an inert gas. EGR control affects combustion within the engine and the resulting output of the engine.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

SUMMARY

An engine includes an exhaust gas recirculation circuit, an air throttle system, and a charging system. A method to control the engine includes determining a feed forward control command for a first selected one of the exhaust gas recirculation system, the air throttle system, and the charging system based on an inverse flow model of the first selected system. This includes monitoring a first input based upon an effective flow area of the first selected system, monitoring a second input based upon a pressure value within the first selected system, and determining the feed forward control command for the first selected system based upon the first input and the second input. The first selected system is controlled based upon the feed forward control command for the first selected system.

BRIEF DESCRIPTION OF THE DRAWINGS

One or more embodiments will now be described, by way of example, with reference to the accompanying drawings, in which:

FIG. 8 depicts an exemplary air throttle system, in accordance with the present disclosure;

FIG. 9 graphically depicts exemplary data that can be used to determine control commands to a VGT, in accordance with the present disclosure;

FIG. 10 graphically depicts an exemplary method to determine a desired VGT position according to a look-up table, in accordance with the present disclosure; and FIG. 11 depicts an exemplary process, in accordance with the present disclosure.

DETAILED DESCRIPTION

Figure 1:
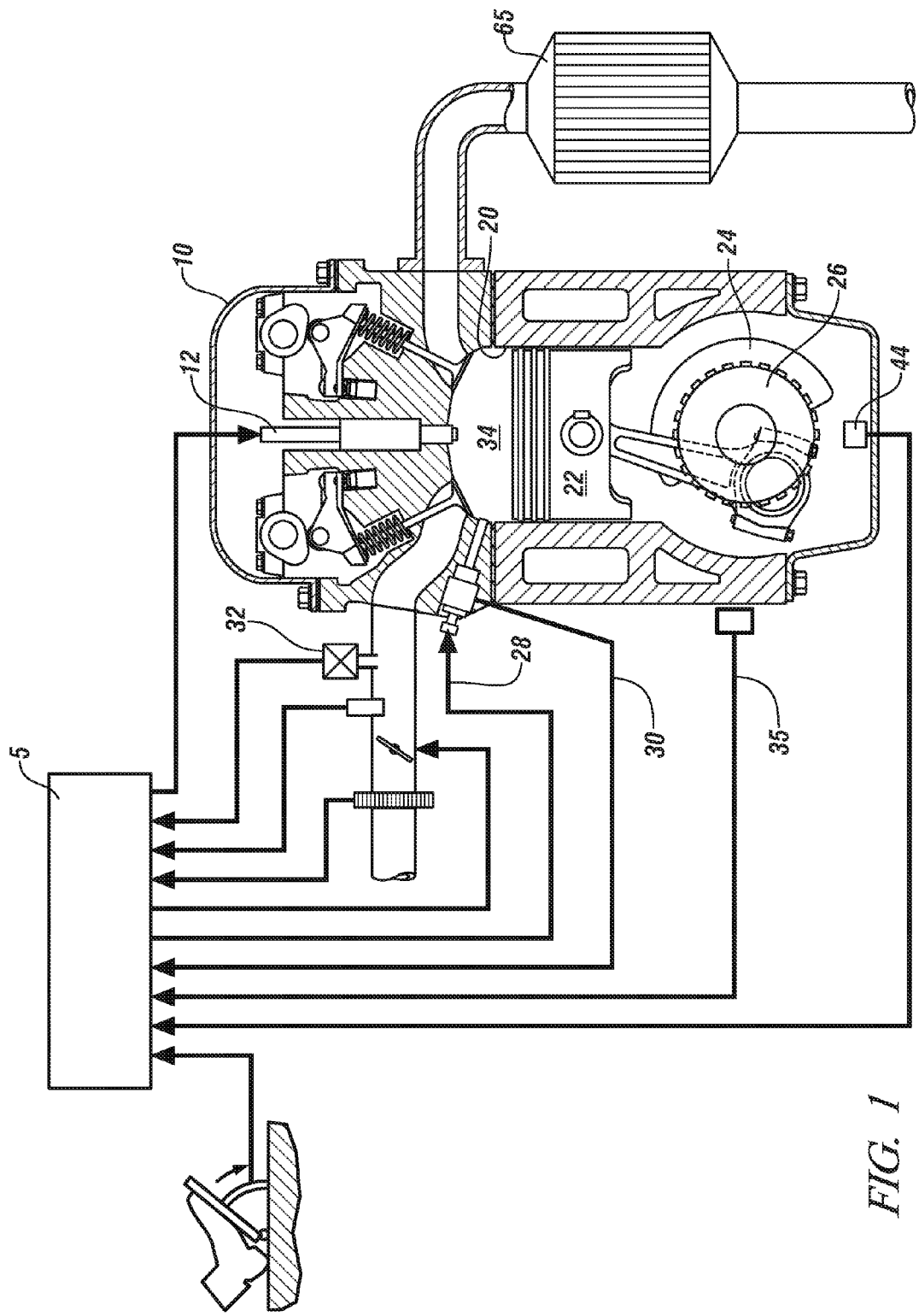
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and algorithms.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the indicated functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
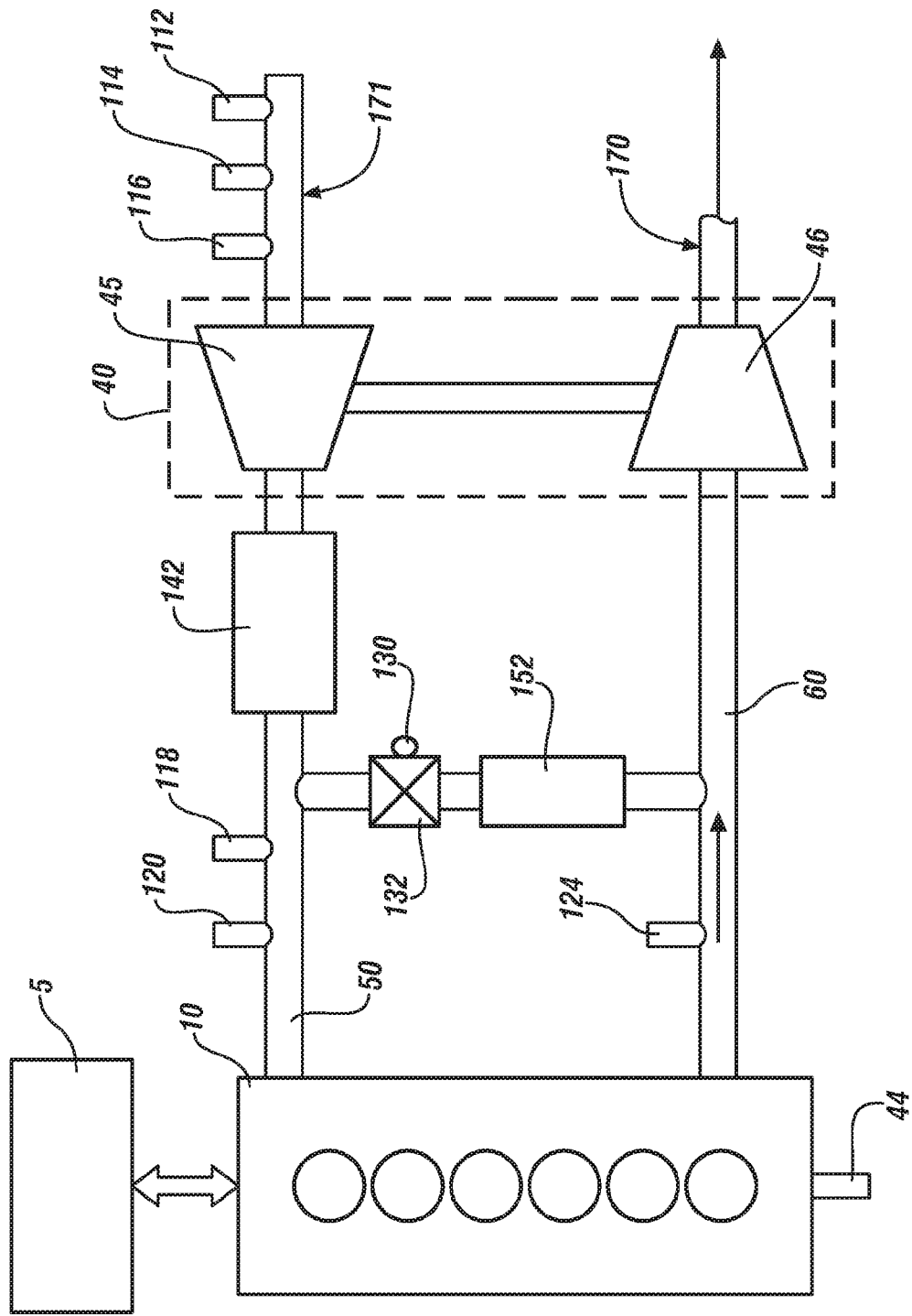
FIG. 2 schematically depicts an exemplary engine configuration including a turbocharger, in accordance with the present disclosure.

FIG. 2 schematically depicts an exemplary engine configuration including a turbocharger, in accordance with the present disclosure. The exemplary engine is multi-cylinder and includes a variety of fueling types and combustion strategies known in the art. Engine system components include an intake air compressor 40 including a turbine 46 and an air compressor 45, a charge air cooler 142, an EGR valve 132 and cooler 152, an intake manifold 50, and exhaust manifold 60. Ambient intake air is drawn into compressor 45 through intake 171. Pressurized intake air and EGR flow are delivered to intake manifold 50 for use in engine 10. Exhaust gas flow exits engine 10 through exhaust manifold 60, drives turbine 46, and exits through exhaust tube 170. The depicted EGR system is a high pressure EGR system, delivering pressurized exhaust gas from exhaust manifold 60 to intake manifold 50. An alternative configuration, a low pressure EGR system, can deliver low pressure exhaust gas from exhaust tube 170 to intake 171. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, an MAP sensor 120, an exhaust gas temperature sensor 124 and an EGR valve position sensor 130. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and algorithms and still fall within the scope of the disclosure. Furthermore, the intake air compressor 40 may include alternative turbocharger configurations within the scope of this disclosure.

The intake air compressor 40 includes a turbocharger including an air compressor 45 positioned in the air intake of the engine which is driven by turbine 46 that is positioned in the exhaust gas flowstream. Turbine 46 can include a number of embodiments, including a device with fixed vane orientations or variable vane orientations. Further, a turbocharger can be used as a single device, or multiple turbochargers can be used to supply boost air to the same engine.

Figure 3:
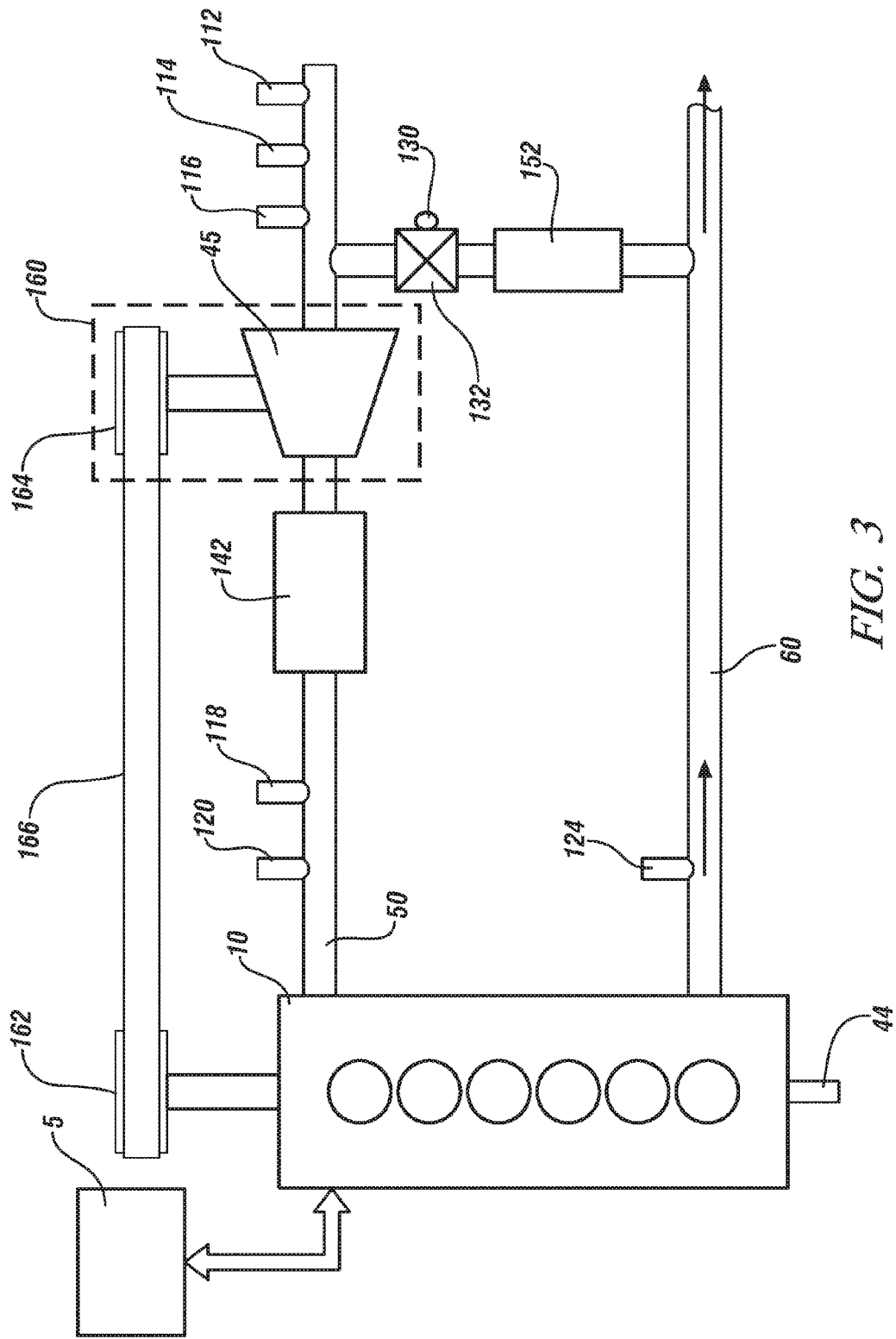
FIG. 3 schematically depicts an exemplary engine configuration including a supercharger, in accordance with the present disclosure.

FIG. 3 schematically depicts an exemplary engine configuration including a supercharger, in accordance with the present disclosure. The exemplary engine is multi-cylinder and includes a variety of fueling types and combustion strategies known in the art. Engine system components include a supercharger 160 comprising an air compressor 45 and a belt driven wheel 164, a charge air cooler 142, an EGR valve 132 and cooler 152, an intake manifold 50, and exhaust manifold 60. Engine 10 includes driven wheel 162, providing power to belt 166 driving belt driven wheel 164. An exemplary belt 166 can include a configuration known in the art as a serpentine belt. Exemplary configurations include belt 166 driving the supercharger 160 and other accessories such as an alternator or an air conditioning compressor simultaneously. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, MAP sensor 120, an exhaust gas temperature sensor 124 and an EGR valve position sensor 130. Exemplary EGR valve 130 and EGR cooler 152 provide a path for EGR flow to enter the intake system upstream of the supercharger 160. Under other configurations, the EGR flow can enter the intake system downstream of the supercharger 160, although it will be appreciated that high pressure downstream of the supercharger can limit conditions in which the EGR flow will effectively enter the intake under this configuration. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and algorithms and still fall within the scope of the disclosure. Supercharger 160 can be used to provide boost air to an engine, or supercharger 160 can be used in cooperation with a turbocharger to provide boost air to an engine.

Variable geometry turbochargers (VGT) enable control of how much compression is performed on intake air. A control signal can modulate operation of the VGT, for example, by modulating an angle of the vanes in the compressor and/or turbine. Such exemplary modulation can decrease the angle of such vanes, decreasing compression of the intake air, or increase the angle of such vanes, increasing compression of the intake air. VGT systems allow a control module to select a level of boost pressure delivered to the engine. Other methods of controlling a variable charger output, for example, including a waste gate or a bypass valve, can be implemented similarly to a VGT system, and the disclosure is not intended to be limited to the particular exemplary embodiments disclosed herein for controlling boost pressure delivered to the engine.

Exemplary diesel engines are equipped with common rail fuel-injection systems, EGR systems, and VGT systems. Exhaust gas recirculation is used to controllably decrease combustion flaming temperature and reduce NOx emissions. VGT systems are utilized to modulate boost pressures to control a manifold air pressure and increase engine output. To accomplish engine control including control of the EGR and VGT systems, a multi-input multi-output air charging control module (MIMO module) can be utilized. A MIMO module enables computationally efficient and coordinated control of EGR and VGT based upon a single set of inputs describing desired engine operation. Such input, for example, can include an operating point for the engine describing an engine speed and an engine load. It will be appreciated that other parameters can be utilized as input, for example, including pressure measurements indicating an engine load.

Coupled MIMO control of both EGR and VGT, or control fixing response of both EGR and VGT based upon any given input, is computationally efficient and can enable complex control responses to changing inputs that might not be computationally possible in real-time based upon independent control of EGR and VGT. However, coupled control of EGR and VGT, including fixed responses of both parameters for any given input, requires simplified or best fit calibrations of the coupled controls in order to control both fixed responses. As a result, such calibrations can be challenging and can include less than optimal engine performance based upon the simplified control calibrations selected. EGR and VGT, for example, might optimally react differently to a rate of change in load or to engine temperatures. Additionally, control of EGR or VGT can reach limit conditions and result in actuator saturation. Coupled control resulting in actuator saturation can cause a condition known in the art as wind-up wherein expected behavior of the system and desired control of the system diverge and result in control errors even after the actuator saturation has been resolved. Additionally, control of EGR and VGT by a MIMO module is nonlinear, and defining the coupled functional relationships to provide the desired control outputs requires extensive calibration work.

Figure 4:
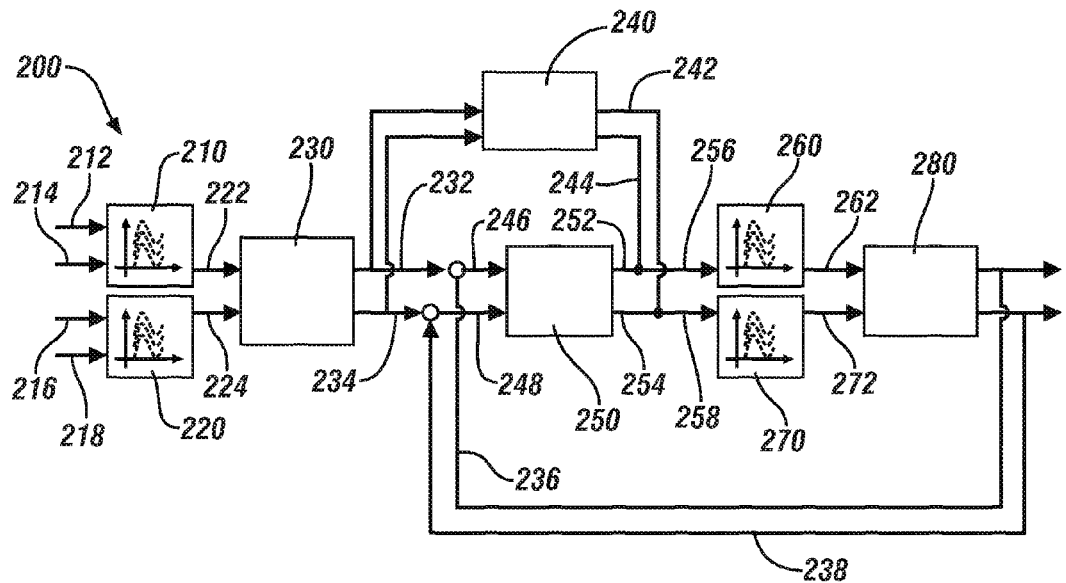
FIG. 4 schematically depicts an exemplary multivariable air-handling control system, including a MIMO module, providing boost air and EGR flow to an engine, in accordance with the present disclosure FIG. 5 graphically depicts exemplary data corresponding to operation of an EGR, in accordance with the present disclosure FIG. 6 graphically depicts exemplary data corresponding to EGR operation and curves fit to the exemplary data, in accordance with the present disclosure.

FIG. 4 schematically depicts an exemplary multivariable air-handling control system, including a MIMO module, providing boost air and EGR flow to an engine, in accordance with the present disclosure. An engine plant 280 receives commands and produces outputs. A number of modules are depicted developing the commands, including EGR set point module 210, boost set point module 220, pre-filter module 230, feed forward module 240, MIMO module 250, EGR actuator limit module 260, and VGT actuator limit module 270. EGR set point module 210 monitors inputs 212 and 214 describing an engine state. Inputs 212 and 214 can include an engine speed and an engine load or other parameters indicating similarly the state of the engine. For example, and engine fueling rate or pressure measurements useful to indicate engine load can be utilized in place of an engine load. EGR set point module 210 outputs an uncorrected EGR set point command 222, for example, describing a calibrated or calculated EGR set point, for example, as can be stored in a look-up table, based upon the engine state. Boost set point module 220 monitors inputs 216 and 218 describing an engine state. Inputs 216 and 218 can be the same as inputs 212 and 214 but need not be the same parameters. Boost set point module 220 outputs an uncorrected boost set point command 224, for example, describing a calibrated or calculated boost set point, for example, as can be stored in a look-up table, based upon the engine state. Pre-filter module 230 applies methods known in the art to condition signals 222 and 224 to create a filtered uncorrected EGR set point command 232 and a filtered uncorrected boost command 234. According to one exemplary embodiment, pre-filter module 230 can include a low pass filter applying a filter based upon $\omega_c/(\omega_c+s)$, wherein $\omega_c$ is a filter cut off frequency and s is a frequency operator. In an alternative embodiment, separate pre-filters could be applied to the separate signals. Feed forward module 240 inputs commands 232 and 234 and generates feed forward EGR command 242 and feed forward VGT command 244. In an exemplary control system, the feed forward commands 242 and 244 developed by feed forward module 240 are based upon the plant dynamics, which generates default actuator positions from the control set points, usually scheduled by engine speed and load. Feedback signals describing an actual EGR position or a resulting EGR rate 236 and an actual VGT position or a resulting boost pressure 238 are compared to respective commands 232 and 234, and an EGR error term 246 and a boost control error term 248 are determined EGR error term 246 and boost control error term 248 are used as inputs to MIMO module 250, embodied as a MIMO feedback controller, and methods disclosed herein are utilized to develop MIMO EGR command 252 and MIMO VGT command 254. Commands 252 and 254 are combined with respective commands 242 and 244 to generate corrected EGR command 256 and corrected VGT command 258. Actuators controlling EGR and VGT can include limits. EGR actuator limit module 260 conditions corrected EGR command 256 based upon actuator limits to generate an EGR position command 262. Similarly, VGT actuator limit module 270 conditions corrected VGT command 258 based upon actuator limits to generate a VGT position command 272. The two inputs to the engine plant 280 include the EGR position command 262 and the VGT position command 272. Both a resulting EGR rate 236 and the resulting boost pressure 238 are depicted outputs of engine plant 280.

VGT commands are one way to control boost pressure. However, other commands controlling a boost pressure such as a boost pressure command or a manifold air pressure command can be utilized similarly in place of VGT commands.

As indicated related to FIG. 4, control commands to control operation of an engine can include feedback control commands and feed forward control commands, which combine to provide an accurate control method. A method to control an engine including EGR and manifold air pressure control includes utilizing a decoupling matrix within a MIMO module to accomplish feedback control, wherein the decoupling matrix is configured based upon a diagonally dominant compensated engine model is disclosed in co-pending and commonly assigned application Ser. No. 12/848,188, which is incorporated herein by reference.

Accurate control including feed forward control of mass air flow and EGR is important to reducing combustion emissions and increase fuel efficiency. Exemplary methods to control EGR valve and air throttle positions require significant table based calibrations accounting for all the combinations of different altitudes, ambient and aftertreatment regeneration modes. A model-based approach, utilizing determined functional relationships to provide outputs based upon a set of inputs, can avoid the intensive calibration required with traditional methods. By controlling an EGR valve and an air throttle control using a model-based approach, extensive calibration required for other methods at different combustion modes, including different altitudes, ambient conditions, cold start and aftertreatment regeneration can be avoided.

Coupled model-based approaches to determine feed forward control commands can be used in a MIMO controller, wherein a particular set of input values or input data will generate a given set of outputs based upon coupled functional relationships within the model. However, complex modeled systems, for example a complex model used to control an engine through a wide range of operating parameters and conditions, do not always permit precise modeling of every possible parameter and condition. Determination of the coupled functional relationships, outputting values for a given set of inputs, frequently requires best fit, interpolation, or averaging of values for the coupled models. The output values can each respond differently to changing parameters and conditions. According to one exemplary embodiment, a model including decoupled functional relationships or a decoupled model permits control of the EGR and air mass as coupled values and boost pressure control as a decoupled or partially decoupled value. Such a decoupled model permits use of a MIMO controller including the benefits thereof while permitting benefits possible by permitting decoupled control of the output values for particular circumstances. In one exemplary embodiment, decoupled control of EGR and air mass from boost control permits a reduction of emission dispersions as compared to coupled control.

An inverse flow model or an inverse of a physical model of a system can be useful in determining settings required to achieve a desired flow through an orifice in the system. Flow through a system can be modeled as a function of a pressure difference across the system and a flow restriction in the system. Known or determinable terms can be substituted and the functional relationship manipulated to make an inverse flow model of the system useful to determine a desired system setting to achieve a desired flow. Exemplary methods disclosed herein utilize a first input of an effective flow area or of a flow restriction for the system being modeled, and a second input including a pressure value for the system of pressure moving the flow through the system. One exemplary method of decoupled feed forward control of an EGR valve can include utilizing an inverse flow model of the system embodied in a mixed polynomial based upon the inverse model and calibrated terms. Another exemplary method of decoupled feed forward control of an EGR valve can include utilizing a dimensional table-based approach. Another exemplary method of decoupled feed forward control of an EGR valve can include utilizing an exponential polyfit model. An exemplary method of decoupled feed forward control of air throttle can utilize an inverse of the physical model of the system, a dimensional table approach, or an exponential polyfit model. An exemplary method of decoupled feed forward control of a charging system, such as a turbocharger equipped with a VGT, can utilize an inverse of the physical model of the system, a dimensional table approach, or an exponential polyfit model.

These methods can be utilized individually or in combination, and different methods can be utilized for the same system for different conditions and operating ranges. A control method can utilize an inverse flow model to determine a feed forward control command for a first selection including one of the EGR circuit, the air throttle system, and the charging system. The control method can additionally utilize a second inverse flow model to determine a second feed forward control command for a second selection including another of the EGR circuit, the air throttle system, and the charging system. The control method can additionally utilize a third inverse flow model to determine a third feed forward control command for a third selection including another of the EGR circuit, the air throttle system, and the charging system. In this way, a control method can control any or all of the EGR circuit, the air throttle system, and the charging system.

Flow through an EGR system can be modeled to estimate the flow based upon a number of known inputs. Flow through the EGR system can be modeled as flow through an orifice, wherein the orifice primarily includes an EGR valve or an orifice or venturi to a particular design. According to one exemplary embodiment, EGR flow, $W_{egr}$, can be modeled according to the following orifice flow equation.

$$W_{egr} = A_{egr} \frac{P_x}{\sqrt{RT_{egr}}} \Psi(PR) \quad [1]$$

PR is a pressure ratio or ratio of intake pressure or pressure of charged air in the intake system at the outlet of the EGR system, $P_i$, to exhaust pressure or pressure in the exhaust system at the inlet of the EGR system upstream of the charging system, $P_x$. $T_{egr}$ can indicate a temperature of the exhaust gas or exhaust gas temperature at the inlet of the EGR system.

According to one exemplary embodiment, $T_{egr}$ can be measured as an exit temperature of the EGR cooler. $A_{egr}$ is the effective flow area of the EGR system. R is the universal gas constant, known in the art. A critical pressure ratio, $PR_c$, can be expressed by the following equation.

$$PR_c = \left(\frac{2}{\gamma+1}\right)^{\frac{\gamma}{\gamma-1}} \quad [2]$$

$\gamma$ is a specific heat ratio, known in the art. If PR is greater than $PR_c$, then flow is subsonic. If PR is less than or equal to $PR_c$, then flow is choked. $\Psi(PR)$ is a non-linear function and can be expressed by the following equation.

$$\Psi(PR) = \begin{cases} \sqrt{\frac{2\gamma}{\gamma-1}(PR^{2/\gamma} - PR^{(\gamma+1)/\gamma})} & PR_c < PR < 1 \text{ (subsonic)} \\ \gamma^{1/2}\left(\frac{2}{\gamma+1}\right)^{\frac{\gamma+1}{2(\gamma-1)}} & PR \leq PR_c \text{ (choked)} \end{cases} \quad [3]$$

$A_{egr}$ can be expressed as a function of EGR valve position, $x_{egr}$. However, based upon detailed modeling and experimental data, including a determination of heat loss through the walls of the system, a more accurate estimation for $A_{egr}$ can be expressed as a function of $x_{egr}$ and PR, which can be expressed by the following equation.

$$A_{egr} = A_{egr}(x_{egr}, PR) \quad [4]$$

The method disclosed above assumes that the EGR system includes an outlet downstream of the charging system compressor and an inlet upstream of the charging system turbo unit or turbine. It will be appreciated that a different embodiment can be utilized with an EGR system including an outlet upstream of the charging system compressor and an inlet downstream of the charging system turbo unit or turbine or in the exhaust system of a vehicle utilizing a supercharger without a turbine. It will be appreciated that the above equations and the associated inverse flow model can be modified for use with a number of exemplary EGR and charging system configurations, and the disclosure is not intended to be limited to the particular exemplary embodiments disclosed herein.

According to the first exemplary method disclosed above, EGR flow can be controlled by an inverse control method according to an inverse model of EGR flow. Inverse control can be described as using a given desired EGR flow to determine a set point for the EGR valve position. An exemplary method utilizing inverse control can utilize two steps: first, determine a desired EGR effective flow area, $A_{egr\_desired}$; and second, use $A_{egr\_desired}$ and a determined PR to determine a desired EGR valve position, $x_{egr\_desired}$. Utilizing desired EGR flow, $W_{cmd}$, as an input and with known $P_i$ and $P_x$ values, $W_{cmd}$ can be controlled by determining $x_{egr\_desired}$ utilizing the following equation.

$$A_{egr\_desired} = \frac{w_{cmd}\sqrt{RT_{egr}}}{P_X \Psi(PR)}, \quad [5]$$

$$x_{egr\_desired} = f(A_{egr\_desired}, PR)$$

According to Equation 5, $x_{egr\_desired}$ can be expressed as function of $A_{egr\_desired}$, a measure of flow restriction through the system, and PR, a pressure value describing a pressure difference for the flow across the system. A specific polynomial realization of the above expression can be expressed by the following equation.

$$x_{egr_{desired}} = a_0 + A_{egr_{desired}}(a_1 + a_2 PR + a_3 PR^2) + A_{egr_{desired}}^2(a_4 + a_5 PR) \quad [6]$$

Equation 6 is a mixed polynomial or an equation fit to experimental data. Constants $a_0$ through $a_5$ can be developed experimentally, empirically, predictively, through modeling or other techniques adequate to accurately predict flow through the EGR system, and a multitude of constants can be developed for different operating conditions or operating ranges. By determination of the constants and application of the expressed polynomial, $x_{egr\_desired}$ can be determined and used to control the EGR valve.

Figure 5:
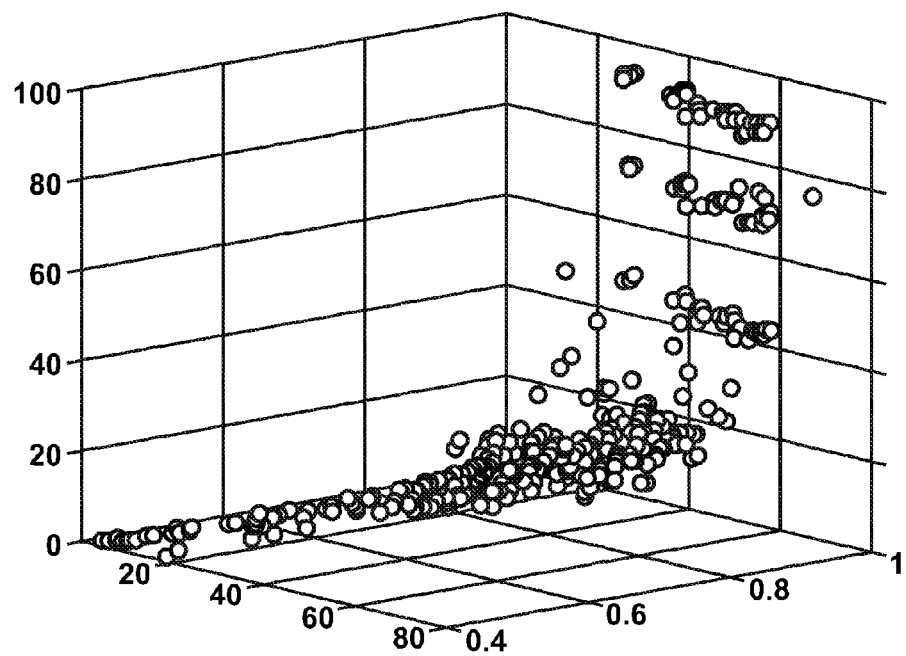

According to the second exemplary method disclosed above, EGR flow can be controlled by an inverse control method according to a table-based inverse model of EGR flow. The first method disclosed above utilizes a polynomial embodiment of the inverse model to determine $x_{egr}$. In another exemplary method, an inverse model of EGR operation can be used to populate a table, and for given inputs, outputs can be generated based upon the contents of the table. FIG. 5 graphically depicts exemplary data representing operation of an EGR, in accordance with the present disclosure. Three axes are depicted. A first axis in a horizontally defined plane with labels extending from the center of the figure and with values from 0 to 80 depicts a corrected EGR flow. A second axis in the same depicted plan extending from the middle of the figure to the right side of the figure and with values from 0.4 to 1 depicts a PR value. A third axis extending vertically depicts an EGR valve position. Values from such data can be stored in a look-up table. According to one exemplary use of a table-based inverse model, with known $P_i$ and $P_x$ values, based upon a known $W_{cmd}$, the EGR valve position can be controlled by the following equation.

$$x_{egr\_desired} = f(A_{egr\_desired}, PR) \quad [7]$$

Utilizing the relationship expressed in Equation 5, Equation 7 can be restated as follows.

$$x_{egr\_desired} = f\left(\frac{w_{cmd}\sqrt{RT_{egr}}}{P_X \Psi(PR)}, PR\right) \quad [8]$$

Therefore, a table-based approach can be utilized utilizing two inputs to determine $x_{egr\_desired}$ as an output. Such a relationship can be expressed by the following equation.

$$x_{egr\_desired} = f(x_1, x_2) \quad [9]$$

$x_1$ and $x_2$ can be defined according to the terms of Equation 8. However, referring to Equation 4, $A_{egr\_desired}$ can be expressed as a function of PR. Simplifying the terms of Equation 8, inputs to Equation 9 can be expressed as follows.

$$x_1 = \frac{w_{cmd}\sqrt{T_{egr}}}{P_X} \quad [10]$$

$$x_2 = PR = \frac{P_i}{P_X} \quad [11]$$

$x_1$ as defined in Equation 10 can be termed a corrected EGR flow. In this way, a set of identified inputs can be utilized in conjunction with a look-up table configured to the particular inputs to generate an output or set of outputs based upon an inverse model of the EGR.

A polynomial expression can be determined based upon an inverse model of EGR operation. Further, a table-based method can be utilized to provide an output value or values based upon an input value or values. According to the second exemplary method disclosed above, an output or outputs can be expressed utilizing a polynomial expression or expressions to provide the function of the look-up table or utilize an exponential polyfit model. Methods are known in the art to fit a polynomial expression to a set of data points. Utilizing an exemplary polynomial expression developed through an inverse model of EGR operation, for example, through the table-based method, a desired EGR valve position can be a polynomial function of $x_2$ for a given $x_1$.

Figure 6:
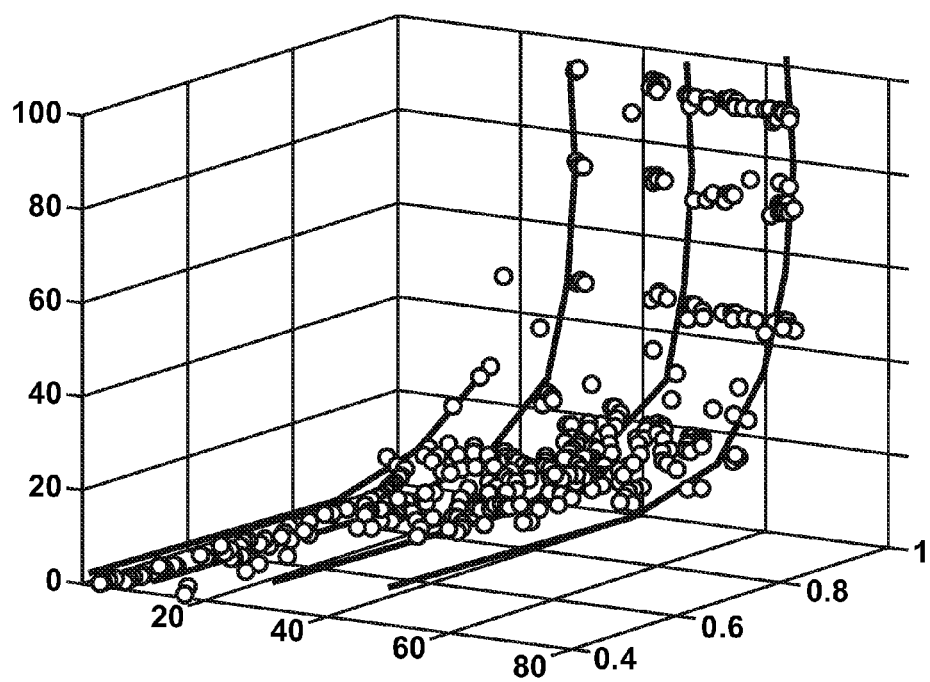

FIG. 6 graphically depicts exemplary data representing EGR operation and curves fit to the exemplary data, in accordance with the present disclosure. Three axes are depicted. A first axis in a horizontally defined plane with labels extending from the left side of the figure to the center of the figure and with values from 0 to 80 depicts an $x_1$ value, for example, corrected EGR flow. A second axis in the same depicted plan extending from the middle of the figure to the right side of the figure and with values from 0.4 to 1 depicts an $x_2$ value, for example, a PR value. A third axis extending vertically depicts an EGR valve position. The depicted curves can each be reduced to a functional polynomial expression. According to exemplary use of an exponential polyfit model, with known $P_i$ and $P_x$ values, based upon a known $W_{cmd}$, the desired EGR valve position can be controlled by the following equation.

$$x_{egr\_desired} = f(x_1, x_2) \quad [12]$$

An exemplary exponential polyfit model comprising a polynomial expression can be expressed by the following equation.

$$x_{egr\_desired} = (k_1 x_2^{k_2} + k_3) x_1^2 + (k_4 x_2^{k_5} + k_6) x_1 + k_7 \quad [13]$$

Constants $k_1$ through $k_7$ can be developed by any method sufficient to accurately fit a polynomial equation to a dataset. In this way, an inverse model describing operation of an EGR can be utilized through an exponential polyfit model to control an EGR valve.

Figure 7:
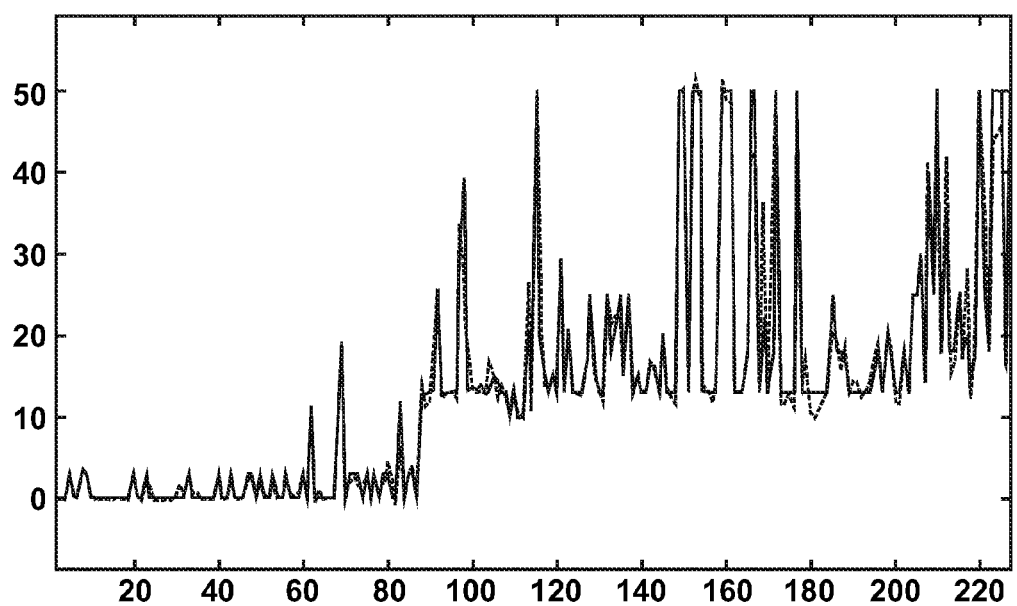
FIG. 7 graphically depicts a comparison of desired EGR valve position and calculated EGR valve position based upon a polyfit model, in accordance with the present disclosure.

FIG. 7 graphically depicts a comparison of an experimental EGR valve position and calculated EGR valve position based upon a polyfit model, in accordance with the present disclosure. An x-axis indicates operating points through a test period. A y-axis indicates an EGR valve position as a percentage. The dotted line represents experimental test values for EGR position, and the solid line represents calculated EGR valve positions according to the polyfit model method disclosed herein. As is evident in the depicted data, the polyfit model closely tracks the experimental EGR valve position values.

An inverse model of operation of an EGR system can be used to provide feed forward control of the EGR system. Similarly, an inverse model of operation of an air throttle system can be used to provide feed forward control of the air throttle system and resulting fresh mass air flow. According to exemplary use of an inverse model of the air throttle system, with known throttle inlet pressure, $P_{ti}$, and throttle outlet pressure, $P_{to}$, values, based upon a known desired fresh mass air flow, $W_{air}$, a desired throttle position, $x_{tp\_desired}$, can be controlled by the following equation.

$$A_{AT\_desired} = \frac{w_{air}\sqrt{RT_{cac}}}{P_{ti}\Psi(PR_{AT})}, x_{tp\_desired} = f(A_{AT\_desired}, PR_{AT}) \quad [14]$$

In an alternative embodiment, $x_{tp\_desired}$, can be controlled by the following equation.

$$A_{AT\_desired} = \frac{w_{air}\sqrt{RT_{im}}}{P_{to}\Psi(PR_{AT})}, x_{tp\_desired} = f(A_{AT\_desired}, PR_{AT}) \quad [15]$$

$A_{AT\_desired}$ is a desired air throttle effective flow area to be determined. $P_{to}$ in many systems substantially equals a manifold air pressure (MAP) and equals $P_i$, indicated above. $P_{ti}$ may be measured between the throttle and a charge air cooler located upstream of the air throttle system. According to one exemplary method, a compressor outlet pressure, $P_c$, can be measured, and a pressure drop across the charge air cooler can be estimated as $\Delta P_{cac}$. One exemplary method to estimate $\Delta P_{cac}$ includes determining $\Delta P_{cac}$ as a function of mass air flow, $\dot{m}_A$. $P_{ti}$ can then be estimated as $P_c$ minus $\Delta P_{cac}$. $T_{cac}$ is a temperature measured at the outlet of the charge air cooler. An air throttle pressure ratio, $PR_{AT}$, can be expressed as $P_{ti}/P_{to}$. $\Psi P(PR_{AT})$ is a non-linear function defined similarly to $\Psi(PR)$ of Equation 3, substituting $PR_{AT}$ for PR. As disclosed similarly above in relation to EGR, a specific polynomial realization of the above expression for the air throttle system to determine $x_{tp\_desired}$ can be expressed as follows.

$$x_{tp\_desired} = b_0 + A_{AT\_desired}(b_1 + b_2 PR_{AT} + b_3 PR_{AT}^2) + A_{AT\_desired}^2(b_4 + b_5 PR_{AT}) \quad [15]$$

Constants $b_0$ through $b_5$ can be developed experimentally, empirically, predictively, through modeling or other techniques adequate to accurately predict flow through the EGR system, and a multitude of constants can be developed for different operating conditions or operating ranges. By determination of the constants and application of the expressed polynomial, $x_{tp\_desired}$ can be determined and used to control the air throttle.

FIG. 8 depicts an exemplary air throttle system, in accordance with the present disclosure. Air throttle system 300 includes throttle valve 310. Charge air cooler 142 is upstream of the throttle valve 310, and MAP sensor 120 is downstream of the throttle valve 310 and can be used to measure $P_{to}$. A pressure sensor 320 is upstream of the throttle valve and downstream of the charge air cooler 142 and represents an exemplary method to monitor $P_{ti}$. A temperature sensor 330 is upstream of the throttle valve and downstream of the charge air cooler 142 and represents an exemplary method to monitor $T_{cac}$.

Mass air flow through an air throttle system can be controlled by an inverse control method according to a table-based inverse model of mass air flow. An inverse model of air throttle operation can be used to populate a table, and for given inputs, outputs can be generated based upon the contents of the table. According to one exemplary use of a table-based inverse model, with known $P_{ti}$ and $P_{to}$ values, based upon a known $W_{air}$, $x_{tp\_desired}$ can be controlled by the following equation.

$$x_{tp\_desired} = f(x_1, x_2) \quad [16]$$

The values $x_1$ and $x_2$ are inputs that can be used in the table-based inverse model to determine $x_{tp\_desired}$. According to one exemplary embodiment of Equation 15, $A_{AT\_desired}$ can be used for $x_1$ and $PR_{AT}$ can be used for $x_2$. According to another exemplary embodiment, $x_1$ can be simplified as a corrected air flow. The corrected air flow can be expressed according to a number of ways as follows.

$$x_1 = \frac{w_{air}\sqrt{T_{im}}}{P_{to}} \quad [17]$$

$$x_1 = \frac{w_{air}\sqrt{T_{cac}}}{P_{to}} \quad [18]$$

$$x_1 = \frac{w_{air}\sqrt{T_{cac}}}{P_{ti}} \quad [19]$$

It will be appreciated that these different equations deliver different values and are not used with a common table, but rather that any of these exemplary $x_1$ equations can be utilized to calibrate a corresponding look-up table. Similarly, an exemplary $x_2$ can be expressed as $P_{ti}/P_{to}$, or, alternatively, $x_2$ can be simplified and expressed as either $P_{ti}$ or $P_{to}$, with correspondingly calibrated look-up tables.

Mass air flow through an air throttle system can be controlled by an inverse control method according to an exemplary polynomial expression developed through an inverse model of air throttle system operation. According to exemplary use of an exponential polyfit model in combination with test or experimental data, modeling data, or other results sufficient to accurately predict operation of the air throttle system, with known $P_{ti}$ and $P_{to}$ values, based upon a known $W_{air}$, the desired throttle position can be controlled by the following equation.

$$x_{tp\_desired} = f(x_1, x_2) \quad [20]$$

An exemplary polynomial function configured to utilize such an exponential polyfit model can be expressed by the following equation.

$$x_{tp\_desired} = (l_1 x_2^{l_2} + l_3)x_1^2 + (l_4 x_2^{l_5} + l_6)x_1 + l_7 \quad [21]$$

Constants $l_1$ through $l_7$ can be developed by any method sufficient to accurately fit a polynomial equation to a dataset. In this way, an inverse model describing operation of an air throttle system can be utilized through an exponential polyfit model to control a throttle.

A number of methods can be used to monitor or determine $P_{ti}$ and $P_{to}$. Pressure sensors can be placed in appropriate locations in the system. According to another exemplary embodiment, either or both $P_{ti}$ and $P_{to}$ can be determined as functions of engine speed and fuel flow rate. These determinations can be expressed by the following equations.

$$P_{ti} = f(\text{engine speed, fuel flow rate}) \quad [22]$$

$$P_{to} = f(\text{engine speed, fuel flow rate}) \quad [23]$$

According to another exemplary embodiment, $P_{ti}$ can be estimated from a physics model based upon an actual or measured mass air flow, $\dot{m}_{A\_actual}$, actual or measured throttle position, $x_{tp\_actual}$, actual or measured boost pressure, which can be estimated as $P_{to\_actual}$, and actual charge air cooler outlet temperature, $T_{cac\_actual}$. Such an estimation or determination can be expressed by the following equation.

$$\frac{P_{ti}}{P_{to\_actual}} = f\left(x_{tp_{actual}}, \frac{\dot{m}_{A_{actual}}\sqrt{T_{cac_{actual}}}}{P_{to_{actual}}}\right) \quad [24]$$

$$= f\left(\frac{1}{x_{tp\_actual}}, \frac{\dot{m}_{A\_actual}\sqrt{T_{cac\_actual}}}{P_{to\_actual}}\right)$$

Measured or determined $P_{ti}$ and $P_{to}$ can be generated in a system in a number of ways. For example, Equations 22-24 can be used as polynomial functional expressions in a control module or values as outputs can be stored in a look-up table.

Methods are disclosed above to determine a feed forward control command for an EGR system and an air throttle system, for example, utilizing one of an inverse of the physical model of the system based upon an inverse flow model, a dimensional table approach based upon an inverse flow model, or an exponential polyfit model based upon an inverse flow model. Similar methods can be utilized to control a charging system, for example, a VGT system.

As disclosed similarly above in relation to an EGR system or an air throttle system, methods based upon an inverse flow model of the VGT system can be utilized. According to one exemplary embodiment, a VGT and an associated desired variable geometry setting, $x_{vgt\_desired}$, with known $P_x$ and pressure downstream of the turbo in the exhaust system or a static pressure, $P_{st}$, values and based upon a known desired average mass exhaust flow through the exhaust system, $\bar{m}_{x\_desired}$, can be controlled by the following equation.

$$A_{vgt\_desired} = \frac{\bar{m}_{x\_desired}\sqrt{RT_x}}{P_X\Psi(PR_{ch})}, x_{vgt\_desired} \quad [25]$$

$$= f(A_{vgt\_desired}, PR_{ch}), x_{vgt\_desired}$$

$$\approx f(A_{vgt\_desired}, P_x)$$

$A_{vgt}$ is an effective flow area for a VGT system. $T_x$ is a temperature of exhaust gas within the exhaust system. According to one exemplary embodiment, the functional relationships of Equation 25 can be simplified and expressed as the following equation.

$$x_{vgt\_desired} = f\left(\frac{P_x}{P_{st}}, \frac{\bar{m}_x\sqrt{T_x}}{P_x}\right), PR_{ch} = \frac{P_x}{P_{st}} \quad [26]$$

The term $$\frac{\bar{m}_x\sqrt{T_x}}{P_x}$$

can be termed a corrected VGT flow rate or a corrected exhaust flow through a turbine of the charging system. A specific polynomial realization of the above expression for the air throttle system to determine $x_{tp\_desired}$ can be expressed as follows.

$$x_{vgt\_desired} = \quad [27]$$
$$c_0 + A_{vgt\_desired}(c_1 + c_2 PR_{ch} + c_3 PR_{ch}^2) + A_{vgt\_desired}^2(c_4 + c_5 PR_{ch})$$

Constants $c_0$ through $c_5$ can be developed experimentally, empirically, predictively, through modeling or other techniques adequate to accurately predict flow through the charging system, and a multitude of constants can be developed for different operating conditions or operating ranges. By determination of the constants and application of the expressed polynomial, $x_{vgt\_desired}$ can be determined and used to control the charging system.

A table-based method to determine $x_{vgt}$ can be utilized based upon data describing operation of a charging system. Used according to a look-up table such as the exemplary look-up table of FIG. 9, a value for $x_{vgt}$ can be determined according to the following equation.

$$x_{vgt} = f(x_1, x_2) \quad [28]$$

A look-up table based upon an inverse flow model for a VGT can be calibrated to correspond to a number of different $x_1$ and $x_2$ terms. $x_1$ for use in determining $x_{vgt}$ can be identified as either $A_{vgt}$ or the corrected VGT flow rate for use with a correspondingly determined look-up table. $x_2$ can include $PR_{ch}$ or as a simplified estimation $P_x$ or $P_{st}$.

$P_x$ can determined according to a number of exemplary methods. For example, a pressure sensor or transducer can be used to directly monitor pressure in the exhaust system. According to another exemplary embodiment, $P_x$ can be estimated, for example, according to the following expression.

$$P_x = f(\text{engine speed, fuel flow rate}) + \bar{P}_i \quad [29]$$

Alternatively, $P_x$ can be determined or estimated according the methods described in commonly assigned U.S. Pat. No. 7,438,061, which is incorporated herein by reference. A number of methods to determine or estimate $P_x$ are known or envisioned, and the disclosure is not intended to be limited to the particular exemplary embodiments provided herein.

FIG. 9 graphically depicts exemplary data that can be used to determine control commands to a VGT, in accordance with the present disclosure. Three axes are depicted. A first axis in a horizontally defined plane with labels extending from the left side of the figure to the center of the figure and with values from 40 reducing to 10 depicts a corrected exhaust flow through a turbine value. A second axis in the same depicted plan extending from the middle of the figure to the right side of the figure and with values from 1 to 5 depicts a $PR_{ch}$ value. A third axis extending vertically depicts a desired VGT position. The values depicted in FIG. 9 can be utilized to generate a look-up table generating desired VGT position as an output.

FIG. 10 graphically depicts an exemplary method to determine a desired VGT position according to a look-up table, in accordance with the present disclosure. Method 400 includes module 410 monitoring a desired boost pressure. A desired boost pressure can in some embodiments be related to $\bar{m}_{x\_desired}$, expressed above. Module 420 inputs the desired boost pressure and additionally inputs an EGR flow estimate, labeled as input 425. Based upon both the desired boost pressure and the EGR flow estimate, a total desired exhaust flow can be determined in module 420. Module 430 inputs this total desired exhaust flow and utilizes it as a corrected exhaust flow through a turbine value for use in a table as indicated in association with FIG. 9 to generate a desired VGT position. Module 440 inputs the desired VGT effective position error from module 430 and applies functional relationships to estimate a resulting boost pressure from the desired VGT position. Module 450 applies limits based upon physical limits of the system being controlled and outputs feed forward control commands for the charging system.

An exponential polyfit equation is expressed above for use with either an EGR system or an air throttle system, utilizing operational data and form fitting equations, known in the art, to model behavior of the system. Similarly, data describing operation of a charging system, for example, including a VGT, can be utilized to determine an exponential polyfit model. An exemplary exponential polyfit model comprising a polynomial expression can be expressed by the following equation.

$$x_{vgt\_desired} = (j_1 x_2^{j_2} + j_3) x_1^2 + (j_4 x_2^{j_5} + j_6) x_1 + j_7 \quad [30]$$

Constants $j_1$ through $j_7$ can be developed by any method sufficient to accurately fit a polynomial equation to a dataset. In this way, an inverse model describing operation of a charging system can be utilized through an exponential polyfit model to control a VGT.

The methods disclosed above can be utilized in a number of ways to control various systems through feed forward control commands. For example, a powertrain can operate any one of the methods indicated in a controller or control module dedicated to controlling a particular system. Multiple controllers or control modules can be used to each control individual controllers with methods disclosed herein. Control of the different systems can be independent or can have some level of interaction, for example, with controllers communicating values or utilizing a common database of tables. One embodiment can include use of a MIMO controller, wherein a set of inputs are utilized by a common controller to output a number of output values. Operation of a MIMO frequently includes coupled determination of feed forward terms, wherein a change to the inputs generates a predictable change in all of the outputs. It will be appreciated that the above methods, describing either functional expressions or look-up table methods to provide feed forward control terms can be used to decouple or partially decouple the output terms of a MIMO controller while minimizing the computational load of the various determinations.

A number of systems can be controlled simultaneously by methods disclosed herein. These systems may use similar or diverse inputs to accomplish their control methods. Although a number of methods may each use an inverse flow model to determine feed forward control commands for each system, it will be appreciated that each of these systems will be modeled by a different inverse flow model for each system. In one exemplary embodiment, control within a single exemplary MIMO controller can determine a control command for an EGR system using a table-based method based upon a first inverse flow model for the EGR system; a control command for an air throttle system utilizing an exponential polyfit equation method based upon a second inverse flow model for the air throttle system; and a control command for a VGT utilizing a mixed polynomial based upon a third inverse flow model for an associated charging system. A number of permutations of this example are possible, and the disclosure is not intended to be limited to the particular example provided.

FIG. 11 depicts an exemplary process to determine a feed forward control of a system, in accordance with the present disclosure. Table 1 includes steps of the depicted process.

TABLE 1

| Step | Description |
|---|---|
| 502 | Monitor an $x_1$ Value Indicating an Effective Flow Area |
| 504 | Monitor an $x_2$ Value Indicating a Pressure Ratio |
| 506 | Determine a Feed Forward Control Command Value Based Upon the $x_1$ and $x_2$ Values |
| 508 | Combine the Feed Forward Control Command Value With a Feedback Command to Control the System |

Process 500 begins at step 502. For the system being controlled, an $x_1$ value indicating an effective flow area is monitored or determined. As described above, such an $x_1$ value can include a simplification, such as a determination of a corrected flow value. Similarly, step 504 monitors or determines an $x_2$ value indicating a pressure ratio. According to the methods of the disclosure, step 506 utilizes the $x_1$ and $x_2$ values to determine a value of a feed forward control command for the system being controlled. In step 508, the determined feed forward control command is combined with a feedback command to control the system. Process 500 is an exemplary process to employ the methods disclosed herein, and the disclosure is not intended to be limited to the particular exemplary embodiment provided.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control an exhaust gas recirculation system, an air throttle system, and a charging system in an internal combustion engine, the method comprising:
   determining a feed forward control command for a first selected one of the exhaust gas recirculation system, the air throttle system, and the charging system based on an inverse flow model of the first selected system, comprising:
      monitoring a first input based upon an effective flow area of the first selected system;
      monitoring a second input based upon a pressure value within the first selected system; and
      determining the feed forward control command for the first selected system based upon the first input and the second input;
   determining a first MIMO command in a MIMO module based on the first input based upon the effective flow area of the first selected system and the second input based upon the pressure value within the first selected system, determining the first MIMO command including utilizing a decoupling matrix within the MIMO module to decouple functional relationships between the first selected system and an unselected one of the exhaust gas recirculation system, the air throttle system, and the charging system such that the first selected system can be controlled independently of the unselected ones of the systems;
   determining a feed forward control command for a second selected one of the exhaust gas recirculation system, the air throttle system, and the charging system based on an inverse flow model of the second selected system, comprising:
      monitoring a first input based upon an effective flow area of the second selected system;
      monitoring a second input based upon a pressure value within the second selected system; and
      determining the feed forward control command for the second selected system based upon the first input and the second input;
   determining a second MIMO command in the MIMO module based on the first input based upon the effective flow area of the second selected system and the second input based upon the pressure value within the second selected system, determining the second MIMO command including utilizing a decoupling matrix within the MIMO module to decouple functional relationships between the first selected system and the second selected system such that the second selected system can be controlled independently of the first selected system;

generating a first position command for the first selected system based upon the feed forward control command for the first selected system, the first MIMO command and actuator limits for a first actuator controlling the first selected system;

generating a second position command for the second selected system based upon the feed forward control command for the second selected system, the second MIMO command and actuator limits for a second actuator controlling the second selected system;

controlling the first actuator controlling the first selected system to operate at the first position command for the first selected system;

controlling the second actuator controlling the second selected system to operate at the second position command for the second selected system; and operating the internal combustion engine with the first selected system operating at the first position command and the second selected system operating at the second position command to achieve a desired engine operating parameter.

2. The method of claim 1, wherein the first selected system is the exhaust gas recirculation system and wherein the feed forward control command for the exhaust gas recirculation system comprises a feed forward control command for an exhaust gas recirculation valve within the exhaust gas recirculation system.

3. The method of claim 2, wherein the pressure value within the first selected system comprises a pressure ratio based upon a pressure at an outlet of the exhaust gas recirculation system and a pressure at an inlet of the exhaust gas recirculation system; and wherein determining the feed forward control command for the first selected system comprises utilizing a mixed polynomial based upon the effective flow area and the pressure ratio.

4. The method of claim 2, wherein determining the feed forward control command for the first selected system comprises utilizing a look-up table populated based upon the inverse flow model of the first selected system and calibrated to provide the feed forward control command for the first selected system.

5. The method of claim 4, wherein the first input comprises a corrected exhaust gas recirculation flow; and wherein the pressure value within the first selected system comprises a pressure ratio based upon a pressure at an outlet of the exhaust gas recirculation system and a pressure at an inlet of the exhaust gas recirculation system.

6. The method of claim 2, wherein determining the feed forward control command for the first selected system comprises utilizing an exponential polyfit model comprising a polynomial expression based upon data from the inverse flow model of the first selected system.

7. The method of claim 2, wherein determining a feed forward control command for the second selected one of the exhaust gas recirculation system, the air throttle system, and the charging system further comprises:

determining a feed forward control command for the air throttle system based on an inverse flow model of the air throttle system, comprising:

monitoring a first input for the air throttle system based upon an effective flow area of the air throttle system;

monitoring a second input for the air throttle system based upon a pressure value within the air throttle system; and determining the feed forward control command for the air throttle system based upon the first input for the air throttle system and the second input for the air throttle system; and controlling the air throttle system based upon the feed forward control command for the air throttle system; and wherein determining the feed forward control command for the air throttle system comprises utilizing one of a mixed polynomial based upon the effective flow area of the air throttle system and a pressure ratio based upon a pressure at an outlet of the air throttle system and a pressure at an inlet of the air throttle system, a look-up table populated based upon the inverse flow model of the air throttle system and calibrated to provide the feed forward control command for the air throttle system, and an exponential polyfit model comprising a polynomial expression based upon data from the inverse flow model of the air throttle system.

8. The method of claim 7, further comprising:

determining a feed forward control command for the charging system based on an inverse flow model of the charging system, comprising:

monitoring a first input for the charging system based upon an effective flow area of the charging system;

monitoring a second input for the charging system based upon a pressure value within the charging system; and determining the feed forward control command for the charging system based upon the first input for the charging system and the second input for the charging system; and controlling the charging system based upon the feed forward control command for the charging system; and wherein determining the feed forward control command for the charging system comprises utilizing one of a mixed polynomial based upon the effective flow area of the charging system and a pressure ratio based upon a pressure at an outlet of the charging system and a pressure at an inlet of the charging system, a look-up table populated based upon the inverse flow model of the charging system and calibrated to provide the feed forward control command for the charging system, and an exponential polyfit model comprising a polynomial expression based upon data from the inverse flow model of the charging system.

9. The method of claim 2, wherein determining a feed forward control command for the second selected one of the exhaust gas recirculation system, the air throttle system, and the charging system further comprises:

determining a feed forward control command for the charging system based on an inverse flow model of the charging system, comprising:

monitoring a first input for the charging system based upon an effective flow area of the charging system;

monitoring a second input for the charging system based upon a pressure value within the charging system; and determining the feed forward control command for the charging system based upon the first input for the charging system and the second input for the charging system; and controlling the charging system based upon the feed forward control command for the charging system; and
wherein determining the feed forward control command for the charging system comprises utilizing one of
a mixed polynomial based upon the effective flow area of the charging system and a pressure ratio based upon a pressure at an outlet of the charging system and a pressure at an inlet of the charging system,
a look-up table populated based upon the inverse flow model of the charging system and calibrated to provide the feed forward control command for the charging system, and
an exponential polyfit model comprising a polynomial expression based upon data from the inverse flow model of the charging system.

10. The method of claim 1, wherein the first selected system is the air throttle system and wherein the feed forward control command for the air throttle system comprises a feed forward control command for an air throttle valve within the air throttle system.

11. The method of claim 10, wherein the pressure value within the first selected system comprises a pressure ratio based upon a pressure at an outlet of the air throttle system and a pressure at an inlet of the air throttle system; and
wherein determining the feed forward control command for the first selected system comprises utilizing a mixed polynomial based upon the effective flow area and the pressure ratio.

12. The method of claim 10, wherein determining the feed forward control command for the first selected system comprises utilizing a look-up table populated based upon the inverse flow model of the first selected system and calibrated to provide the feed forward control command for the first selected system.

13. The method of claim 12, wherein the first input comprises a corrected mass air flow; and
wherein the pressure value within the first selected system comprises a pressure ratio based upon a pressure at an outlet of the air throttle system and a pressure at an inlet of the air throttle system.

14. The method of claim 10, wherein determining the feed forward control command for the first selected system comprises utilizing an exponential polyfit model comprising a polynomial expression based upon data from the inverse flow model of the first selected system.

15. The method of claim 10, further comprising:
determining a feed forward control command for the charging system based on an inverse flow model of the charging system, comprising:
monitoring a first input for the charging system based upon an effective flow area of the charging system;
monitoring a second input for the charging system based upon a pressure value within the charging system; and
determining the feed forward control command for the charging system based upon the first input for the charging system and the second input for the charging system; and
controlling the charging system based upon the feed forward control command for the charging system; and
wherein determining the feed forward control command for the charging system comprises utilizing one of
a mixed polynomial based upon the effective flow area of the charging system and a pressure ratio based upon a pressure at an outlet of the charging system and a pressure at an inlet of the charging system,
a look-up table populated based upon the inverse flow model of the charging system and calibrated to provide the feed forward control command for the charging system, and
an exponential polyfit model comprising a polynomial expression based upon data from the inverse flow model of the charging system.

16. The method of claim 1, wherein the first selected system is the charging system and wherein the feed forward control command for the charging system comprises a feed forward control command for a variable geometry turbocharger within the charging system.

17. The method of claim 16, wherein the pressure value within the first selected system comprises a pressure ratio based upon an exhaust system pressure upstream of the charging system in the exhaust system and a pressure downstream of the charging system in the exhaust system; and
wherein determining the feed forward control command comprises utilizing a mixed polynomial based upon the effective flow area and the pressure ratio.

18. The method of claim 16, wherein determining the control command for the first selected system comprises utilizing a look-up table populated based upon the inverse flow model and calibrated to provide the feed forward control command for the first selected system.

19. The method of claim 18, wherein the first input comprises a corrected exhaust flow through a turbine of the variable geometry turbocharger within the charging system; and
wherein the pressure value within the first selected system comprises a pressure ratio based upon an exhaust system pressure upstream of the charging system in the exhaust system and a pressure downstream of the charging system in the exhaust system.

20. The method of claim 16, wherein determining the feed forward control command for the first selected system comprises utilizing an exponential polyfit model comprising a polynomial expression based upon data from the inverse flow model of the first selected system.

21. The method of claim 1, wherein determining the feed forward control command for the first selected system comprises determining the feed forward control command for the first selected system utilizing a multiple input multiple output controller.

22. The method of claim 21, wherein the inverse flow model selectively decouples the feed forward control command for the first selected system from another feed forward control command.

23. Apparatus to control an exhaust gas recirculation system, an air throttle system, and a charging system in an internal combustion engine, comprising:
the exhaust gas recirculation system comprising an exhaust gas recirculation valve;
the air throttle system comprising an air throttle valve;
the charging system comprising a variable geometry turbocharger; and
a control module:
determining a feed forward control command for a first selected one of the exhaust gas recirculation system, the air throttle system, and the charging system based on an inverse flow model of the first selected system, comprising:
monitoring a first input based upon an effective flow area of the first selected system;
monitoring a second input based upon a pressure value within the first selected system; and determining the feed forward control command for the first selected system based upon the first input and the second input;

determining a first MIMO command in a MIMO module based on the first input based upon the effective flow area of the first selected system and the second input based upon the pressure value within the first selected system, determining the first MIMO command including utilizing a decoupling matrix within the MIMO module to decouple functional relationships between the first selected system and an unselected one of the exhaust gas recirculation system, the air throttle system, and the charging system such that the first selected system can be controlled independently of the unselected ones of the systems;

determining a feed forward control command for a second selected one of the exhaust gas recirculation system, the air throttle system, and the charging system based on an inverse flow model of the second selected system, comprising:

monitoring a first input based upon an effective flow area of the second selected system;

monitoring a second input based upon a pressure value within the second selected system; and determining the feed forward control command for the second selected system based upon the first input and the second input;

determining a second MIMO command in the MIMO module based on the first input based upon the effective flow area of the second selected system and the second input based upon the pressure value within the second selected system, determining the second MIMO command including utilizing a decoupling matrix within the MIMO module to decouple functional relationships between the first selected system and the second selected system such that the second selected system can be controlled independently of the first selected system;

generating a first position command for the first selected system based upon the feed forward control command for the first selected system, the first MIMO command and actuator limits for a first actuator controlling the first selected system;

generating a second position command for the second selected system based upon the feed forward control command for the second selected system, the second MIMO command and actuator limits for a second actuator controlling the second selected system;

controlling the first actuator controlling the first selected system to operate at the first position command for the first selected system; and controlling the second actuator controlling the second selected system to operate at the second position command for the second selected system; and operating the internal combustion engine with the first selected system operating at the first position command and the second selected system operating at the second position command to achieve a desired engine operating parameter.

* * * * *